US009272663B2

(12) United States Patent
Smith et al.

(10) Patent No.: US 9,272,663 B2
(45) Date of Patent: Mar. 1, 2016

(54) WIRELESS TOW LIGHT OPERATING SYSTEM

(71) Applicants: Thomas P. Smith, Winfield, IL (US); Roger Latimer, Mundelein, IL (US)

(72) Inventors: Thomas P. Smith, Winfield, IL (US); Roger Latimer, Mundelein, IL (US)

(73) Assignee: Tiger Accessory Group, LLC, Long Grove, IL (US)

( * ) Notice: Subject to any disclaimer, the term of this patent is extended or adjusted under 35 U.S.C. 154(b) by 189 days.

(21) Appl. No.: 14/077,847

(22) Filed: Nov. 12, 2013

(65) Prior Publication Data

US 2014/0132402 A1 May 15, 2014

Related U.S. Application Data

(60) Provisional application No. 61/725,187, filed on Nov. 12, 2012.

(51) Int. Cl.
  *G08B 21/00* (2006.01)
  *B60Q 1/30* (2006.01)

(52) U.S. Cl.
  CPC ............ *B60Q 1/305* (2013.01); *B60Q 2900/30* (2013.01)

(58) Field of Classification Search
  CPC .................................. B60Q 1/26; B60Q 1/305
  USPC .......................................... 340/463–479, 431
  See application file for complete search history.

(56) References Cited

U.S. PATENT DOCUMENTS

| | | | |
|---|---|---|---|
| 4,859,982 A | 8/1989 | Seaburg | |
| 5,195,813 A | 3/1993 | Brown | |
| 5,198,798 A | 3/1993 | Lietzow et al. | |
| 5,424,715 A | 6/1995 | Lietzow et al. | |
| 5,666,103 A | 9/1997 | Davis, Jr. | |
| 5,797,672 A | 8/1998 | Dobert | |
| 6,100,801 A * | 8/2000 | Plummer | 340/479 |
| 6,177,867 B1 | 1/2001 | Simon et al. | |
| 6,686,837 B2 | 2/2004 | Kim | |
| 6,784,795 B1 | 8/2004 | Pories et al. | |
| 6,847,863 B2 | 1/2005 | Lamke et al. | |
| 6,978,202 B2 | 12/2005 | Lamke et al. | |
| 7,026,919 B2 | 4/2006 | Perlman et al. | |
| 7,199,705 B1 | 4/2007 | Mixon | |
| 7,557,699 B2 | 7/2009 | Walton | |
| 8,295,189 B2 * | 10/2012 | Hassan et al. | 370/252 |
| 8,957,770 B2 * | 2/2015 | Hu et al. | 340/431 |

(Continued)

FOREIGN PATENT DOCUMENTS

WO     WO 8911984     12/1989

*Primary Examiner* — Brent Swarthout
(74) *Attorney, Agent, or Firm* — Greer, Burns & Crain, Ltd.

(57) ABSTRACT

A tow vehicle operating system is provided for wirelessly connecting a first lighting system of a towing vehicle to a second lighting system of a towed vehicle. A wireless transmitter on the towing vehicle broadcasts a linking signal having an identification code and an associated data indicating a present status of lights of the towing vehicle based on an illumination signal from the towing vehicle, over a selected one of a plurality of distinct channels or frequencies. A wireless receiver on the towed vehicle receives the linking signal and verifies the identification code, and transmits an acknowledgement signal to the transmitter, thereby locking in the selected channel or frequency for a wireless communication between the first and second lighting systems. Lights of the towed vehicle are operated in response to the associated data of the linking signal.

19 Claims, 2 Drawing Sheets

(56) References Cited

U.S. PATENT DOCUMENTS

| | | |
|---|---|---|
| 2005/0258947 A1 | 11/2005 | Kunianski |
| 2006/0028327 A1* | 2/2006 | Amis .......................... 340/431 |
| 2006/0238317 A1 | 10/2006 | Colledge |
| 2008/0258899 A1 | 10/2008 | Stiles et al. |
| 2010/0102947 A1 | 4/2010 | Chen |

* cited by examiner

WIRELESS TOW LIGHT OPERATING SYSTEM

BACKGROUND

The present invention relates to wireless taillight systems for vehicles, whereby a towed vehicle is wirelessly connected to a towing vehicle such that at least one of running, turning or stopping lights from the towing vehicle are transmitted to the towed vehicle. More specifically, the present invention relates to improvements in the operating systems for such wireless systems.

Conventional towing light assemblies are designed to address the problem occurring when a trailer, implement or other vehicle (hereinafter "towed vehicle") is being towed by a tow vehicle, the running, stop and/or turn lights of the tow vehicle are obstructed by the towed vehicle. Many jurisdictions require that the towed vehicle be equipped with supplemental indicator lights for signaling the intentions of the tow vehicle to other traffic. Accordingly, many towed vehicles are equipped with wired-in taillight systems including a connector, such as a jack configured for interfacing with the electrical system of the tow vehicle such that the towed vehicle's lighting system is synchronized with that of the tow vehicle.

U.S. Pat. No. 6,100,801 discloses a radio controlled light bar including a tow vehicle unit which is adapted to be electrically connected to the lighting system of the vehicle, and a trailer unit attached to the towed vehicle. The tow vehicle unit includes an analog to RF frequency converter, an RF oscillator, a modulator and a four-channel 900 MHz radio transmitter. The trailer unit includes a radio receiver, a decoder, an amplifier and a managing circuit. In operation, a light signal from the vehicle is converted from analog to RF by the frequency converter. The modulator impresses the light signal onto a carrier frequency as provided by the RF oscillator, and the radio transmitter transmits the signal through one of the four channels or frequencies. Each of the channels of the transmitter is dedicated to one or more of the signals for indicating braking, taillight, and left and right turning of the vehicle.

In the trailer unit, the radio receiver receives the signal transmitted from the tow vehicle unit. The decoder then demodulates the received signal from the RF oscillating frequency and decodes the signal into the light signal received from the vehicle, i.e., braking, taillight or turning. The signal managing circuit then outputs the light signal to the different light elements depending on the type of signal received.

A problem with such conventional units is that in some cases, interference is received from other wireless transmitters on nearby vehicles on the roadway, resulting in improper or faulty signals transmitted to the towed vehicle, with the resulting potential for misleading lighting displayed by the towed vehicles.

SUMMARY

The above-identified need is met by the present system, in which interference from adjacent wireless systems is reduced. A related advantage of the present system is that the required signal transmission power is reduced, and the duration of signals transmitted by the transmitter on the towing vehicle is reduced. This latter feature reduces the burden on overall wireless transmitting frequencies.

In the present operating system, including a wireless transmitter on the towing vehicle, and a wireless receiver on the towed vehicle, the transmitter sends an initial linking signal, with an identification code, over several distinct channels. The receiver receives and verifies the identification code, then sends an acknowledgement signal to the transmitter, locking in the transmitter for wireless communication over a selected one of the channels. Subsequent lighting instructions transmitted by the transmitter are received by the receiver over the locked channel.

In the event the receiver intercepts an interfering signal, as from a closely adjacent wireless system in an adjacent lane on the highway, the receiver notes a disruption in the signal, unlocks the relationship with the transmitter on the previous channel, and shifts to another channel for establishing a new locked relationship. At the same time, the transmitter commences a transmission of the locking signal sequentially over several channels. Once the transmitter arrives at the new channel to which the receiver has shifted, a new signal locking arrangement is achieved. It is contemplated that the shifting of locking channels by the transmitter is either directly numerically sequential (e.g., channel 1, 2, 3, 4, etc.) or non-numerically sequential (e.g., channel 1, 4, 5, 3, 6, etc.). In a preferred embodiment, the power range of the transmitter is 92.8-94 dB.

DETAILED DESCRIPTION

Figure 1:
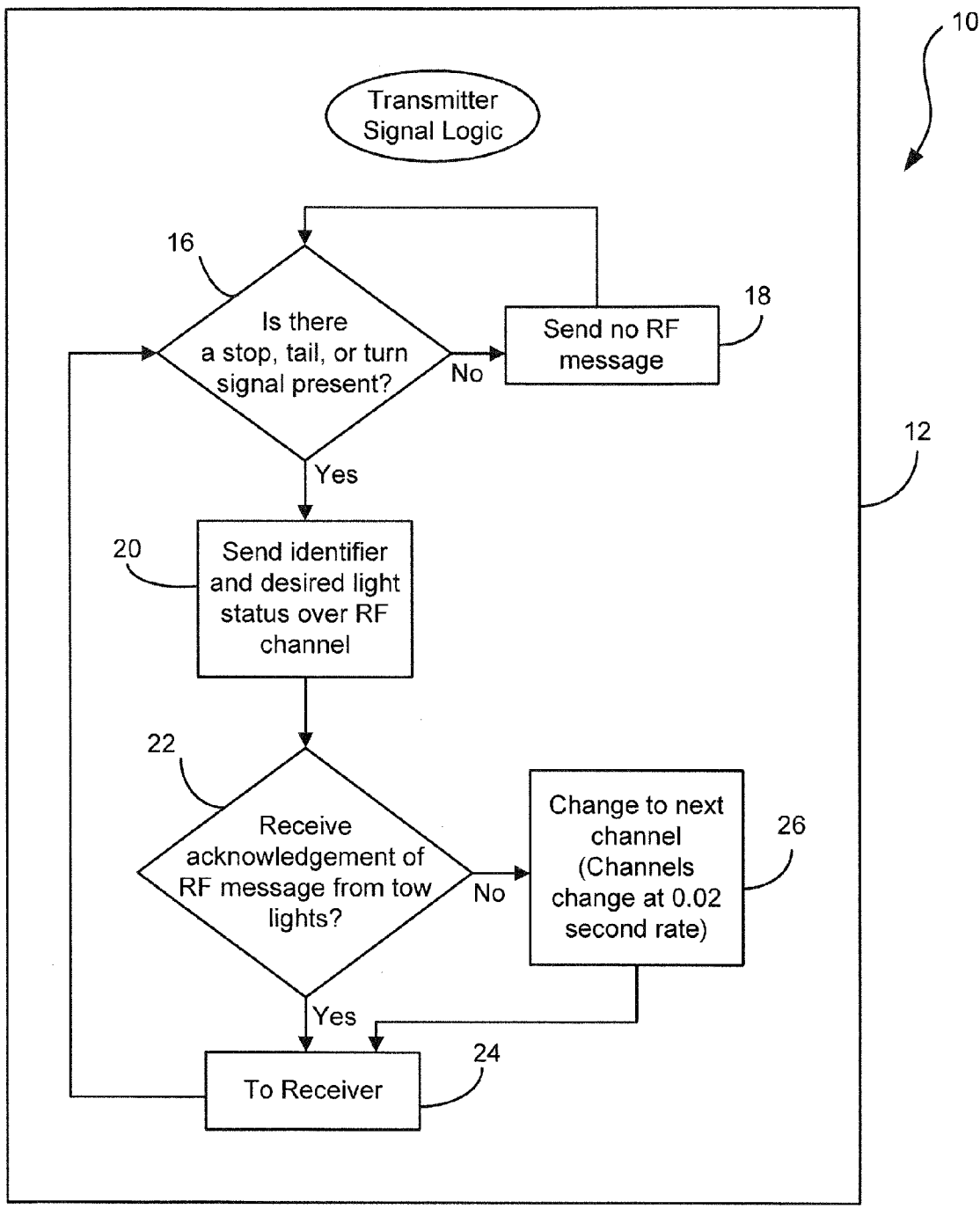
FIG. 1 is a flow chart of the present operating system, focusing on the transmitter.
Figure 2:
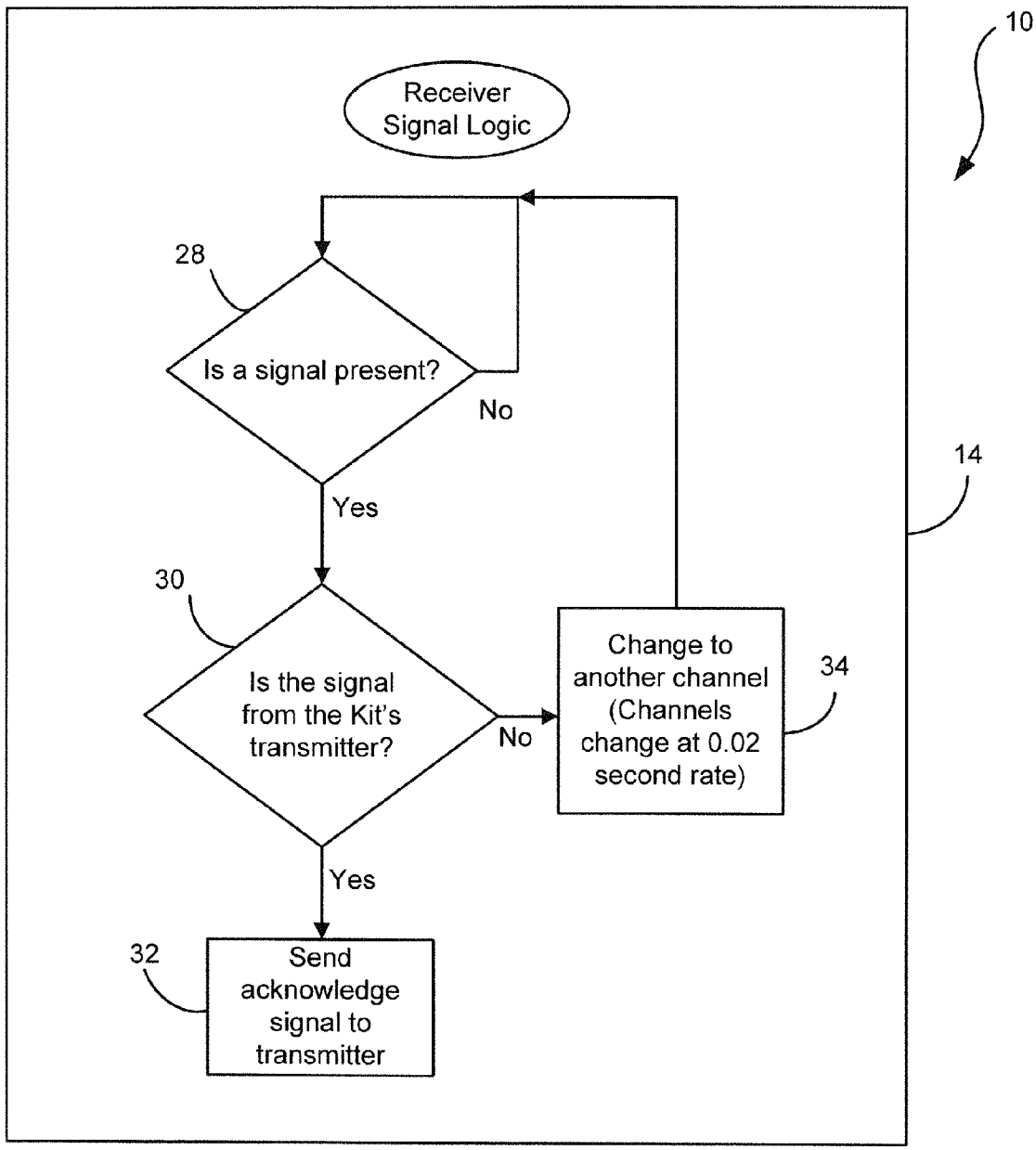
FIG. 2 is a flow chart of the present operating system, focusing on the receiver.

Referring to FIGS. 1 and 2, the present wireless tow light operating system is generally designated 10, and includes a transmitter 12 located on the towing vehicle, and a receiver 14, located on the towed vehicle, such as a trailer or other such towed vehicles well known in the art. In a preferred embodiment, the power range of the transmitter 12 is 92.8-94 dB and the preferred frequency of communication between the transmitter and the receiver 14 is in the 900 MHz range. Also, the transmitter 12 is connected to the wiring system of the towing vehicle, as is well known in the art, and receives signals generated by the towing vehicle to the internal vehicle lighting system during operation of the vehicle, namely illumination of tail lights, brake lights and turn signals. Since an advantage of the present system 10 is that the transmitter 12 and the receiver 14 are connected wirelessly, there are no cables needed between the towing and towed vehicle. As such, the transmitter 12 wirelessly, preferably through radio frequency (RF) transmissions, communicates with the receiver 14. Referring to step 16, the transmitter 12 only is powered when a stop, tail, or turn signal lamp is illuminated on the towing vehicle. Without illumination, as seen at step 18, there is no RF signal transmitted.

Referring now to step 20, upon receipt of a power/illumination signal from the towing vehicle, the transmitter 12 broadcasts an identifier signal, followed by the data indicating the present status of the vehicle lights. In the preferred embodiment, this broadcast is transmitted on one of five frequencies or channels (the terms are considered interchangeable in this application), however the number of frequencies may vary to suit the situation. Next, at step 22, the transmitter 12 then monitors that frequency for receipt of an acknowledgement signal from the receiver 14.

If an acknowledgement signal is returned by the receiver 14, then, as seen at step 24, the transmitter 12 continues to broadcast on that channel at regular intervals until stop, turn, tail lights are all off and no illumination signals are being generated by the towing vehicle. When another signal is to be sent, the transmitter 12 will once again choose this channel/frequency for the next broadcast.

Referring now to step 26, if the acknowledgement signal does not come back to the transmitter 12 from the receiver 14, the transmitter will change channels at a rate of about one channel each 0.02 seconds until an acknowledgement signal is received. If the towed vehicle lights are turned off and the transmitter 12 is plugged in, the transmitter will continuously broadcast on the five frequencies programmed into the transmitter. If the tow lights are turned on and the transmitter 12 is plugged in, the transmitter will broadcast on just one frequency, unless the receiver changes to another frequency due to interference.

Referring now to FIG. 2, at step 28, the receiver 14 monitors the last channel/frequency it was set to. If there is a signal on that channel, at step 30 the receiver 14 determines whether the signal is from the transmitter 12 that it was formerly paired with. The receiver 14 looks for the identifying code at the beginning of the RF transmission, and then turns on the correct lights based on the data that follows the identifier signal. At step 32, the receiver 14 also sends an acknowledge message or signal to the transmitter 12 upon receipt of each successful message. Referring now to step 34, if the signal received by the receiver 14 is not from the transmitter 12 to which it was previously paired, the receiver switches to another channel and does not send the acknowledge message. In the preferred embodiment, channels on the receiver 14 change at a rate of about one channel each 0.12 seconds, however other intervals are contemplated depending on the application. This process loops until a proper communications link with the transmitter 12 is established.

Generally, the transmitter 12 will receive an acknowledge signal after each time it sends a light instruction signal. The system 10 will then just use one of the five channels, since the acknowledgment signal indicates that proper communication has been established. During use, the receiver 14 constantly monitors the channel. If there is interference on this channel, represented by lack of a signal at step 28, the receiver 14 will change to another channel. The transmitter 12 will note this change after the first transmission because it will not receive the acknowledge signal. The transmitter 12 will then change channels, the receiver 14 will send out the acknowledge signal and once again, the system 10 will use just one channel.

While a particular embodiment of the present wireless tow light operating system has been described herein, it will be appreciated by those skilled in the art that changes and modifications may be made thereto without departing from the present disclosure in its broader aspects and as set forth in the following claims.

The invention claimed is:

1. A tow vehicle operating system for wirelessly connecting a first lighting system of a towing vehicle to a second lighting system of a towed vehicle, comprising:
   a wireless transmitter on the towing vehicle, the transmitter broadcasting a linking signal having an identification code and an associated data indicating a present status of lights of the towing vehicle based on an illumination signal from the towing vehicle, over a selected one of a plurality of distinct channels or frequencies;
   a wireless receiver on the towed vehicle, the receiver receiving the linking signal and verifying the identification code, and transmitting an acknowledgement signal to the transmitter, thereby locking in the selected channel or frequency for a wireless communication between the first and second lighting systems; and
   wherein lights of the towed vehicle are operated in response to the associated data of the linking signal, and
   wherein the receiver is configured for acknowledging the linking signal from the transmitter, and for changing the selected channel upon interference of the linking signal to the receiver.

2. The tow vehicle operating system of claim 1, wherein said system is configured so that upon interference of the linking signal to the receiver, the receiver automatically changes the selected channel to one of unused channels of the plurality of distinct channels, and the transmitter commences a transmission of the linking signal sequentially over the unused channels.

3. The tow vehicle operating system of claim 1, wherein the transmitter is configured for monitoring the selected channel for receipt of the acknowledgement signal from the receiver.

4. The tow vehicle operating system of claim 1, wherein said system is configured so that if the acknowledgement signal is returned by the receiver, the transmitter continues to broadcast the linking signal on the selected channel at regular intervals until the illumination signal discontinues.

5. The tow vehicle operating system of claim 1, wherein said system is configured so that if the acknowledge signal is not returned by the receiver, the transmitter sequentially changes the selected channel to one of unused channels of the plurality of distinct channels until the acknowledgement signal is received.

6. The tow vehicle operating system of claim 1, wherein the receiver is configured for monitoring the selected channel and determines whether the linking signal is from a transmitter that was formerly paired with based on the identification code.

7. The tow vehicle operating system of claim 6, wherein said system is configured so that if the receiver determines that the linking signal received by the receiver is not from the transmitter that was formerly paired with, the receiver changes the selected channel to one of unused channels of the plurality of distinct channels and does not transmit the acknowledgement signal to the transmitter.

8. The tow vehicle operating system of claim 1, wherein said system is configured so that if the transmitter receives the acknowledgement signal over the selected channel, the same selected channel is used for subsequent transmissions of the linking signals.

9. The tow vehicle operating system of claim 1, wherein the receiver is configured for transmitting the acknowledgement signal after each time the transmitter sends the linking signal to the receiver based on the illumination signal.

10. A computer-implemented tow vehicle operating method for wirelessly connecting a first lighting system of a towing vehicle to a second lighting system of a towed vehicle, comprising:
   broadcasting a linking signal having an identification code and an associated data, over a selected one of a plurality of distinct channels or frequencies via a wireless transmitter on the towing vehicle;
   indicating a present status of lights of the towing vehicle based on an illumination signal from the towing vehicle using the associated data;
   receiving the linking signal and verifying the identification code;
   transmitting an acknowledgement signal to the transmitter via a wireless receiver on the towed vehicle;
   locking in the selected channel or frequency for a wireless communication between the first and second lighting systems;

operating lights of the towed vehicle in response to the associated data of the linking signal; and changing the selected channel upon interference of the linking signal to the receiver.

11. The tow vehicle operating method of claim 10, further comprising:

automatically changing the selected channel to one of unused channels of the plurality of distinct channels upon interference of the linking signal to the receiver; and commencing a transmission of the linking signal sequentially over the unused channels.

12. The tow vehicle operating method of claim 10, further comprising monitoring the selected channel for receipt of the acknowledgement signal from the receiver.

13. The tow vehicle operating method of claim 10, further comprising continuing to broadcast the linking signal on the selected channel at regular intervals until the illumination signal discontinues.

14. The tow vehicle operating method of claim 10, further comprising sequentially changing the selected channel to one of unused channels of the plurality of distinct channels until the acknowledgement signal is received.

15. The tow vehicle operating method of claim 10, further comprising:

monitoring the selected channel; and determining whether the linking signal is from a transmitter that was formerly paired with based on the identification code.

16. The tow vehicle operating method of claim 15, further comprising stopping transmission of the acknowledgement signal to the transmitter when the linking signal received by the receiver is not from the transmitter that was formerly paired with.

17. The tow vehicle operating method of claim 10, further comprising using the same selected channel for subsequent transmissions of the linking signals if the transmitter receives the acknowledgement signal over the selected channel.

18. The tow vehicle operating method of claim 10, further comprising transmitting the acknowledgement signal after each time the transmitter sends the linking signal to the receiver based on the illumination signal.

19. A tow vehicle operating system for wirelessly connecting a first lighting system of a towing vehicle to a second lighting system of a towed vehicle, comprising:

a wireless transmitter on the towing vehicle, the transmitter broadcasting a linking signal having an identification code and an associated data indicating a present status of lights of the towing vehicle based on an illumination signal from the towing vehicle, over a selected one of a plurality of distinct channels or frequencies;

a wireless receiver on the towed vehicle, the receiver receiving the linking signal and verifying the identification code, and transmitting an acknowledgement signal to the transmitter, thereby locking in the selected channel or frequency for a wireless communication between the first and second lighting systems; and wherein lights of the towed vehicle are operated in response to the associated data of the linking signal, and wherein said system is configured so that upon interference of the linking signal to the receiver, the receiver automatically changes the selected channel to one of unused channels of the plurality of distinct channels, and the transmitter commences a transmission of the linking signal sequentially over the unused channels.

\* \* \* \* \*